US012531038B2

(12) United States Patent
Klanner et al.

(10) Patent No.: US 12,531,038 B2
(45) Date of Patent: Jan. 20, 2026

(54) MUSICAL STRING

(71) Applicant: Thomastik-Infeld Gesellschaft m.b.H., Vienna (AT)

(72) Inventors: Franz Klanner, Vienna (AT); Bernhard Rieger, Vienna (AT)

(73) Assignee: Thomastik-Infeld Gesellschaft m.b.H., Vienna (AT)

( * ) Notice: Subject to any disclaimer, the term of this patent is extended or adjusted under 35 U.S.C. 154(b) by 318 days.

(21) Appl. No.: 18/109,374

(22) Filed: Feb. 14, 2023

(65) Prior Publication Data

US 2023/0260483 A1 Aug. 17, 2023

(30) Foreign Application Priority Data

Feb. 14, 2022 (AT) .............................. A 50100/2022

(51) Int. Cl.
*G10D 3/10* (2006.01)
*B21F 7/00* (2006.01)

(52) U.S. Cl.
CPC ................. *G10D 3/10* (2013.01); *B21F 7/00* (2013.01)

(58) Field of Classification Search
CPC ................ G10D 3/10; G10D 3/00; B21F 7/00
See application file for complete search history.

(56) References Cited

U.S. PATENT DOCUMENTS

2011/0219933 A1 9/2011 Klanner

FOREIGN PATENT DOCUMENTS

| | | | | |
|---|---|---|---|---|
| CA | 2355034 A1 * | 2/2002 | ............... G10D 3/10 |
| CN | 114399983 A * | 4/2022 | ............... G10D 3/10 |
| DE | 202015105091 A1 | 10/2015 | |
| EP | 3776524 A1 * | 2/2021 | ............... D07B 1/04 |

OTHER PUBLICATIONS

Office Action in Austria Application No. A 50100/2022, mailed Jan. 25, 2023, 3 pages.

* cited by examiner

*Primary Examiner* — Kimberly R Lockett
(74) *Attorney, Agent, or Firm* — Liang & Hennessey LLP; Brian Hennessey

(57) ABSTRACT

In a musical string for bowed string instruments, having a supporting string core, an outer winding layer and at least one first intermediate winding layer, wherein the first intermediate winding layer is arranged between the string core and the outer winding layer, wherein the first intermediate winding layer has at least one first winding element and at least one second winding element, wherein the at least one first winding element and the at least one second winding element are wound around the string core in the form of a multi-start helical line, the first winding element is made of a first material and the second winding element is made of a second material, that a first value of a first mechanical property type of the first material is different from a second value of the first mechanical property type of the second material to a predeterminable degree.

24 Claims, 1 Drawing Sheet

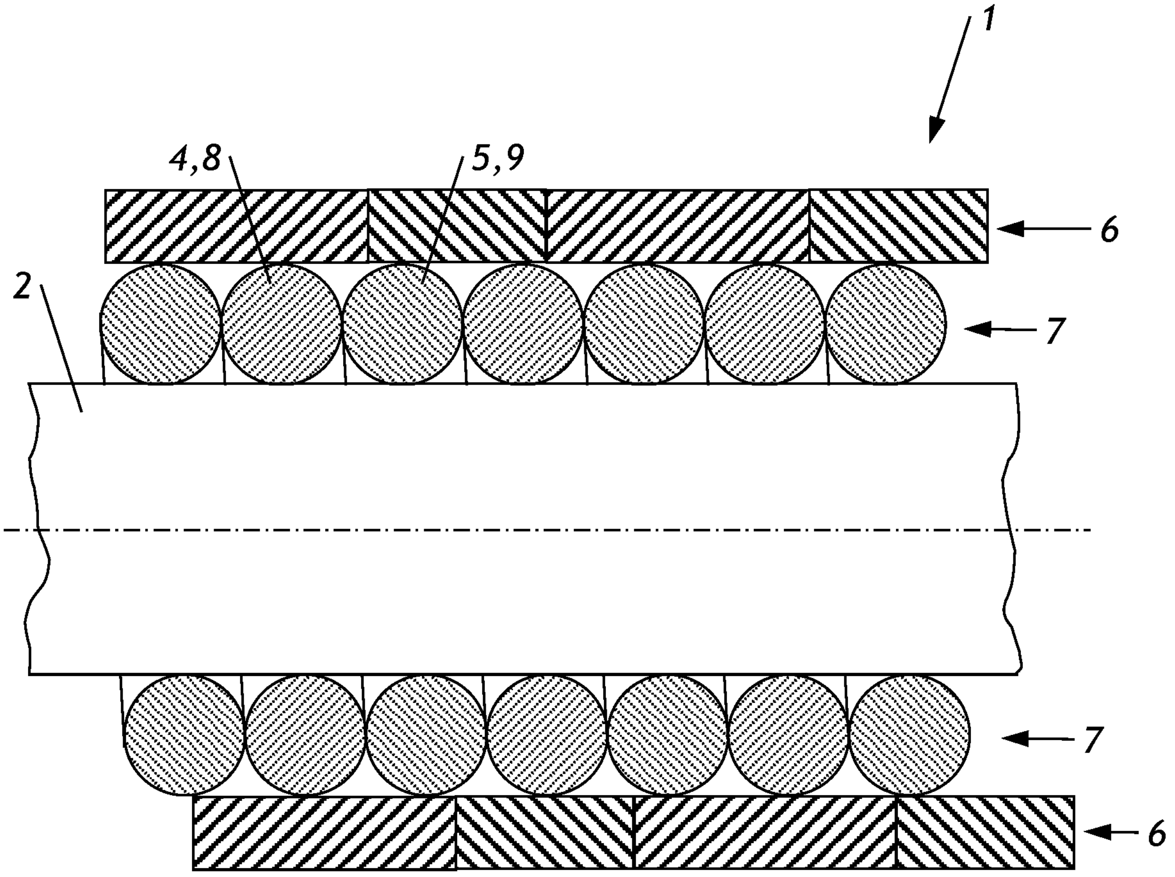
1
4,8
5,9
6
2
7
7
6

MUSICAL STRING

CROSS-REFERENCE TO RELATED APPLICATIONS

The present application claims the benefit of Austrian Patent Application No. A 50100/2022, filed Feb. 14, 2022, entitled "MUSICAL STRING", which is incorporated by reference in its entirety.

BACKGROUND OF THE INVENTION

1. Field of the Invention

The invention relates to a musical string.

2. Description of the Related Art

Musical strings have a string core, which is loaded when the musical string is tensioned. Musical strings for bowed string instruments for lower tunings usually have windings or winding layers to increase the mass coating of the musical string. The fundamental frequency at which a musical string vibrates depends on the vibrating length or scale of the musical string in question, the force with which the musical string in question is tensioned, and the mass coating of the musical string. The particular structure of the musical string has a great influence on its sound, particularly its overtone distribution, as well as its playability. The term "playing technique" refers in particular to their response, their reaction to a change of bow, and their ability to actually noticeably change the sound or fineness of sound—as intended by the musician and consciously induced by his or her hand movements.

It has been shown that many types of musical strings often have very typical sound characteristics, which are often very limited. This is to be understood in such a manner that individual types of musical strings each have individual playing and/or tonal particularities.

SUMMARY OF THE INVENTION

It is therefore the object of the invention to provide a musical string of the type mentioned above, with which the disadvantages mentioned can be avoided, and which has equally good sound characteristics over wide frequency ranges.

According to the invention, this is achieved by the features of the present technology.

This makes it possible to create musical strings that have equally good sound characteristics over wide frequency ranges. This allows the actual vibrational properties of a musical string to be specifically adjusted.

The winding layers of a musical string are—due to their mass—partly responsible for the resonant frequency of the musical string. In addition, these have a further influence on the musical string and its sound. Winding layers influence the degree or characteristics of vibration damping. The winding layers influence the diameter of the musical string and thus the torsional vibrations. By using two different winding elements with predeterminable differences in one and the same kind or type of a mechanical property, these effects or particularities can be influenced and adjusted. It has been shown that individual materials can have a particularly strong influence on certain properties of the musical string. By combining certain materials that have certain differences, the advantages of individual materials can be combined. In this manner, it is avoided that individual particularities, which are particularly strongly caused or supported by a certain material, can be retained per se, but are no longer the sole and leading particularities of the musical string, since, in addition, the preferred particularities of the second material are also effective. Therefore, by arranging two different basic materials or materials, preferred effects of individual materials can be exploited, adverse effects of individual materials can be mitigated, and the balance or usability of the musical string can be improved.

Furthermore, the present construction of a musical string allows the mass coating to be well adjusted in wide ranges during the development of a musical string, which means that the musical string can be well adapted to its intended tuning tone. By combining the first winding element with the second winding element within an intermediate winding layer, the mass coating and the diameter of the musical string can be advantageously adjusted over a wide range. The diameter of a musical string has a direct influence on the response of the musical string in question, as well as on the occurrence of inharmonic overtones.

The dependent claims relate to further advantageous embodiments of the invention.

Express reference is hereby made to the wording of the claims, whereby the claims are incorporated by reference into the description at this point and are deemed to be reproduced verbatim.

BRIEF DESCRIPTION OF THE DRAWINGS

The invention is described in more detail with reference to the accompanying drawings, in which only preferred embodiments are shown by way of example. In the drawings:

FIG. 1 is an example of a detailed cutaway view of a present musical string.

DETAILED DESCRIPTION

FIG. 1 shows a musical string 1 for bowed string instruments, having a supporting string core 2, an outer winding layer 6 and at least one first intermediate winding layer 7, wherein the first intermediate winding layer 7 is arranged between the string core 2 and the outer winding layer 6, wherein the first intermediate winding layer 7 has at least one first winding element 4 and at least one second winding element 5, wherein the at least one first winding element 4 and the at least one second winding element 5 are wound around the string core 2 in the form of a multi-start helical line, wherein the first winding element 4 is made of a first material and the second winding element 5 is made of a second material, and wherein a first value of a first mechanical property of the first material is different from a second value of the first mechanical property of the second material at least to a predeterminable degree of differentiation.

This allows musical strings 1 to be created which have equally good sound characteristics over wide frequency ranges. This allows the actual vibrational properties of a musical string 1 to be specifically adjusted.

The winding layers of a musical string 1 are—due to their mass—partly responsible for the resonant frequency of the musical string 1. In addition, they have a further influence on the musical string 1 and its sound. Winding layers 6, 7 influence the degree or manifestation of vibration damping. The winding layers 6, 7 influence the diameter of the musical string 1 and thus the torsional vibrations. By using two different winding elements 4, 5 with predeterminable differences in one and the same kind or type of a mechanical property, these effects or particularities can be influenced and adjusted. It has been shown that individual materials can have a particularly strong influence on certain properties of the musical string 1. By combining certain materials that have certain differences, the advantages of individual materials can be combined. In this manner, it is avoided that individual particularities, which are particularly strongly caused or supported by a certain material, can be retained per se, but are no longer the sole and leading particularities of the musical string 1, since, in addition, the preferred particularities of the second material are also effective. Therefore, by arranging two different basic materials or materials, preferred effects of individual materials can be exploited, adverse effects of individual materials can be mitigated, and the balance or usability of the musical string 1 can be improved.

Furthermore, the present construction of a musical string 1 allows the mass coating to be well adjusted in wide ranges during the development of a musical string 1, which means that the musical string 1 can be well adapted to its intended tuning tone. By combining the first winding element 4 with the second winding element 5 within an intermediate winding layer 7, the mass coating and the diameter of the musical string can be advantageously adjusted over a wide range. The diameter of a musical string 1 has a direct influence on the response of the musical string 1 in question, as well as on the occurrence of inharmonic overtones.

A “sound” or a “tone” is a sum or an interaction of a fundamental vibration and a plurality of harmonic overtones. The vibrational properties of the musical string 1 in different frequency ranges therefore have a direct influence on the individual vibrations generated, hence amplitude and response or quality, and thus on the sound of the combination in question of the body of the bowed string instrument and the musical string 1 attached thereto. It has been shown that above all the beginning of a sound production, this can also be called the transient process, is the decisive feature for the perception of a musical instrument and a sound. This is also substantial for the recognition—also of the basic type or affiliation—of a musical instrument by a listener. It has been shown that this important transient process can be very strongly influenced by the mechanical properties of the intermediate winding layer 7. By using at least two winding elements 4, 5, which differ in their mechanical properties, it is possible to specifically influence the vibration characteristics of the musical string 1 and thus the sound and, above all, the transient process. This allows direct influence on the simultaneous transient response in different frequency ranges, namely fundamental vibrations and overtones. As a result, a musical string 1 can be created which has considerable advantages in terms of playing technique and sound.

The embodiment shown in the figure is shown in simplified form. The proportions do not have to correspond to the intended real proportions. For better understanding, individual parts may be shown in a highly magnified view. Furthermore, in the representation the individual parts of the shown musical string 1 are each shown directly adjacent to one another, wherein in this respect real musical strings 1 can have partial distances between individual parts or at individual points in accordance with the present invention.

The present musical string 1 is a musical string 1 for bowed string instruments. This includes not only bowing but also stimulation by means of plucking. The preferred instruments are in particular those of the violin family, hence the violin or fiddle, the viola, the violoncello or cello, and the bass or double bass or bass violin. Further preferred instruments for the use of musical strings 1 according to the invention are viola da gamba and viola d’amore.

A piano is not a bowed string instrument. Pianos have significant mechanical differences from bowed string instrument, which is why strings of pianos and strings of bowed string instruments differ significantly, and piano strings cannot be used on a bowed string instrument, as this would result in massive damage to the bowed string instrument.

Musical strings 1 according to the invention are provided for generating tone-generating vibrations, wherein a certain type of musical string 1 is provided for use with a certain type of musical instrument, and further have a tuning tone and a so-called tuning weight as features, wherein the tuning tone indicates the fundamental tone with which a part of the musical string 1—between the end areas thereof—of the length of the scale of the certain type of musical instrument vibrates when the musical string 1 is loaded with the tuning weight, hence tensioned, and has been excited to vibrate.

Musical strings 1 according to the invention have a string core 2, which is intended and designed to absorb the load or tension to which the musical string 1 is subjected when stretched on a musical instrument. The string core 2 is preferably formed as a single wire, a wire rope, a plastic fiber bundle or a natural gut. Each of these differently formed types of a string core 2 are known in their own right in musical strings 1, and each have certain advantages or preferred environments of use. The present invention can be implemented with any type of design of the string core 2.

The musical string 1 has at least one outer or outermost or external winding layer 6. The outer winding layer 6 has at least one outer winding element. Preferably, the outer winding layer 6 has a plurality of outer winding elements which are wound around the string core 2 in the form of a multi-start helical line, although these do not directly contact the string core 2.

The musical string 1 has at least one first intermediate winding layer 7. This first intermediate winding layer 7 is arranged between the string core 2 and the outer winding layer 6. The first intermediate winding layer 7 is therefore enclosed by the outer winding layer 6. Furthermore, the musical string 1 can preferably also have a second intermediate winding layer or even a higher number of intermediate winding layers.

The first intermediate winding layer 7 has at least one first winding element 4 and at least one second winding element 5. In accordance with a preferred embodiment, the intermediate winding layer 7 further has at least a third winding element.

The at least one first winding element 4 and the at least one second winding element 5, as well as the preferred at least one third winding element, are wound around the string core 2 in the form of a multi-start helical line. A multi-start helical line has the basic form or structure of a two-start or three-start or multi-start thread. In the case of only one first and one second winding element 4, 5, hence in the case of two winding elements 4, 5, these are wound around the string core 2 in the form of a two-start helical line, which two-start helical line can also be referred to as a double helix. The second winding element 5 is arranged adjacent to the first winding element 4 in the same intermediate winding layer 7. The figure shows a schematic representation of a present musical string 1, wherein the two winding elements 4, 5 of the intermediate winding layer 7 are being distinguished by different hatchings. As shown, the two winding elements 4, 5 alternate in the longitudinal extension of the musical string 1, and together form the intermediate winding layer 7. In the case of a total of three winding elements 4, 5, these are wound around the string core 2 in the form of a three-start helical line, and in the case of four winding elements 4, 5, these are wound around the string core 2 in the form of a four-start helical line.

The first winding element 4 and the second winding element 5 are wound onto the string core 2 during the manufacture of the musical string 1, wherein it may be provided that the first winding element 4 and the second winding element 5 are wound close together, wherein substantially no or only very small gaps occur between the individual adjacent windings. However, it may also be provided that a predeterminable gap is provided between the individual adjacent windings.

The individual winding elements 4, 5 can have different shapes. The individual winding elements 4, 5 can preferably have a substantially rectangular, square, hexagonal, ellipsoidal or circular cross-section, wherein a mixed cross-section can also be formed, which has both rounded and flat lateral elements.

Like the shape of the cross-section, the basic design of the winding elements 4, 5 can also be different. For example, the winding elements 4, 5 can be formed as a rope consisting of a plurality of individual elements. It is particularly preferred that the first winding element 4 is formed as a first wire 8 and the second winding element 5 is formed as a second wire 9, and that the first wire 8 has a first diameter and the second wire 9 has a second diameter substantially identical to the first diameter. In this context, wire 8, 9 is referred to in particular as a so-called round wire. This has proven to be advantageous both in terms of processability, the manufacture of both the semi-finished products in question and then the musical string 1, and in terms of the vibrational effect. The two winding elements 4, 5 therefore have the same shape from a purely visual point of view, but are also made of different materials. Preferably, it is provided that the diameter of the first or second wires 8, 9, which are formed as round wires, is between 0.05 mm and 0.4 mm.

Insofar as a third winding element is also provided, it is preferably provided that the third winding element is formed as a third wire having a third diameter, and that the third diameter is substantially identical to the first wire 8 and the second wire 9. The same shaping of the individual winding elements 4, 5 also results in an outer winding layer 6 arranged thereon having uniform friction with its base.

It is provided that the intermediate winding layer 7 has at least a first and a second winding element 4, 5. It is also possible for three or four winding elements 4, 5 to be arranged in an intermediate winding layer 7. In accordance with particularly preferred embodiments, it is provided that the intermediate winding layer 7 has:

- two first winding elements 4 and one second winding element 5, or
- one first winding element 4 and two second winding elements 5, or
- three first winding elements 4 and one second winding element 5, or
- one first winding element 4 and three second winding elements 5, or
- two first winding elements 4 and two second winding elements 5, or
- one first winding element 4 and one second winding element 5 and one third winding element. When using three different winding elements 4, 5, it is also possible to use more than one of the three different winding elements 4, 5.

A sheathing of the individual winding elements 4, 5 is not mandatory, but preferably possible. In particular, it is provided that at least one coating is arranged on the first winding element 4 and/or the second winding element 5 and/or the third winding element. This allows the contact friction between the adjacent winding elements 4, 5 to be influenced or adjusted in a predefinable manner. In tests, it has proven to be advantageous if the at least one coating is formed in particular as an oxide layer and/or nitride layer and/or sulfide layer and/or metal layer and/or paint layer and/or plastic layer.

Preferably—with regard to the mechanical structure of the musical string 1—it is further provided that a polymeric damping layer is arranged at least at an area of the intermediate winding layer 7 facing the string core 2. In particular, an oil-wax mixture is provided as the polymer.

It is provided that the first winding element 4 is made of a first material and the second winding element 5 is made of a second material. A specification in the form: "two first winding elements 4" indicates two winding elements 4 made of the same first material. Preferably, the musical string 1 has a third winding element which is made of a third material, which third material is neither the first material nor the second material.

Materials of solid bodies have mechanical properties. Mechanical properties, which can also be referred to as mechanical properties of substances, are in particular: density, strength, tensile strength, modulus of elasticity, yield strength, spring property, material damping and damping properties. Mechanical properties do not comprise thermal conductivity. Thermal conductivity is not a mechanical property. Thermal conductivity is a thermodynamic property of a substance.

It is provided that a first value of a first mechanical property of the first material differs from a second value of the first mechanical property of the second material at least to a predeterminable or determined degree. In this context, the term "first mechanical property" refers to a specific type of a mechanical property. In other words, "first mechanical property" indicates the selected mechanical property from the group of: density and/or strength, in particular tensile strength, and/or modulus of elasticity and/or yield strength and/or spring property and/or material damping and/or damping properties and/or interfacial friction. The first mechanical property may be, for example, and in accordance with a first preferred embodiment, density. In this case, the density of the first material must be different from the density of the second material. The different density causes a different inertia of the first winding element 4 and the second winding element 5, which has an effect on the vibration behavior of the musical string. The difference in density must exceed at least a predefinable value. This value or the degree of differentiation can be both in a physical unit and in percent. When density is selected as the first mechanical property, the preferred degree of differentiation would be at least 5 $g/cm^3$.

Herein, values of mechanical properties are to be compared. In most cases, this requires the use of at least one measuring device and/or measuring setup and/or data sheet, encyclopedia, textbook or similar. When using at least one measuring device or measuring setup, the measuring accuracies of the measuring device or measuring setup shall be taken into account when determining the differentiating feature. When using a data sheet, encyclopedia, textbook or similar, e.g., for density data, it must be taken into account that the actual materials used may differ in their structure or purity from the test elements which were measured for the value published in the documents. This difference can be significant enough that the values according to the data sheet, encyclopedia, textbook or the like do not harmonize sufficiently with reality. To determine the first and the second value, therefore, at least one measuring device and/or one measuring setup are preferably to be used. The value of differentiation can be determined from the first value determined in this way and the second value by using subtraction. This value of differentiation must at least have or exceed the size of a predeterminable degree of differentiation.

In addition to the differentiation concerning a first mechanical property, it can also be provided that a second mechanical property—different from the first mechanical property—is also selected, and the first material also differs from the second material at least by a certain second value of differentiation.

When using a third winding element comprising a third material, it is further provided that a third value of the first mechanical property of the third material is different from the first value of the first mechanical property of the first material and the second value of the first mechanical property of the second material to a predeterminable degree of differentiation.

Alternatively, it may be provided that the first and second materials differ with respect to a first mechanical property, and that the third material differs from the second material with respect to a second mechanical property.

As stated above, in accordance with a first preferred embodiment, the selected first mechanical property is density. In accordance with a second preferred embodiment, the first mechanical property is the modulus of elasticity. In this case, the preferred degree of differentiation is at least 10 GPa, preferably 20 GPa, in particular 30 GPa. GPa stands for gigapascal. Tungsten, for example, has a modulus of elasticity of approximately 405 GPa. Steel, for example, has a modulus of elasticity between 190 and 215 GPa.

In accordance with a third preferred embodiment, the first mechanical property is tensile strength. In this case, the preferred degree of differentiation is at least 200 $N/mm^2$.

In accordance with a fourth preferred embodiment, the first mechanical property is the yield strength or yield stress. In this case, the preferred degree of differentiation is at least 150 $N/mm^2$.

The at least one first winding element 4, the at least one second winding element 5 and preferably at least one third winding element can be made of different materials which have different mechanical properties.

Preferably, it is provided that the first material and/or the second material and/or the third material is each a material selected from the group of: tungsten or tungsten alloy or nickel or nickel alloy or tantalum or tantalum alloy or molybdenum or molybdenum alloy or manganese or manganese alloy or ruthenium or ruthenium alloy or rhodium or rhodium alloy or rhenium or rhenium alloy or palladium or palladium alloy or osmium or osmium alloy or beryllium alloy, preferably: copper beryllium or beryllium bronze, or phosphor bronze. These materials have proven to be beneficial, although individual materials often have very different properties, and are beneficial in certain combinations.

A statement is made below on the preferred embodiments of individual metals mentioned as being particularly preferred.

As such, each chemical element mentioned as a single element can be used on its own, therefore, can be used without further added materials. In reality, however, even a pure material will contain certain alloying elements.

Tungsten has proven to be advantageous due to its high density and hardness. In addition to pure tungsten, tungsten alloys, in particular tungsten-based alloys with a tungsten content greater than 50 mass percent. In particular, the following tungsten alloys have proven to be particularly advantageous: tungsten-nickel alloys and/or tungsten-molybdenum alloys. Preferred tungsten-nickel alloys are in particular W90NiCu; W92.5NiCu; W95NiCu; W92.5NiFe; W95NiFe; W97NiFe. Preferred tungsten-molybdenum alloys are in particular: W90NiMoFe as well as other alloys comprising—besides tungsten and molybdenum—the following additional alloying elements: titanium, zirconium, hafnium and/or carbon.

In addition to pure nickel, especially nickel alloys, and in particular nickel-based alloys are provided. Preferred nickel-based alloys are monel or monel metal, Inconel, Udimet, Alloy, or a beryllium-containing nickel alloy. Furthermore, the nickel alloy may be a wrought nickel alloy, in particular Ni99.2; Ni99.6; Ni99.8; NiMn2. Other preferred nickel alloys are NiCuFe, NiCu and NiC.

With regard to density and mechanical properties, tantalum in particular has proven to be very advantageous.

Furthermore, the following metals or alloys have proven to be very advantageous: Al, AlMg, AlMgMn, AlMgSi, Ti6Al4V, Ti Grade 1, Ti Grade 2, Ti Grade 3, Ti Grade 4, Ti Grade 5, Ti Grade 6, Ti Grade 7, Ti-6Al-7Nb.

In addition to the design of the materials from or as metal, the use of plastic is also preferred. In a further development of the invention, it is therefore preferably provided that the first material and/or the second material and/or the third material each comprises a plastic, selected from the group of: polymers and/or aramid and/or PEK and/or PAEK and/or PEEK and/or PBT and/or polyester and/or nylon and/or polyethylene and/or PET and/or PEET and/or PES and/or PE and/or PP and/or POM and/or PTFE and/or PVDF and/or PVDC and/or HPPE and/or PA and/or PVC. Plastics have significantly different properties, especially lower density, than metals.

PA 6.4, PA 6.6, PA 6.10, PEEK, PES and/or PVDF have proven to be particularly preferred plastics.

Plastics also exhibit significantly different interfacial friction than metals. These different interfacial frictions have an effect on the vibration behavior of a correspondingly formed musical string, which vibration behavior can be specifically influenced as a result. In addition to the fact that both winding elements 4, 5 are made of—different—plastics, this shows significant effects with regard to vibrational properties, particularly in combinations between metal and plastic. A combination is defined as the use of a metal as the first material and a plastic as the second material.

Individual, preferred embodiments of present musical strings are set forth below. Individual combinations of a first winding element made of one of the aforementioned metals or alloys and a second winding element made of one of the aforementioned metals or alloys have proven to be particularly advantageous.

In accordance with a first preferred embodiment of a musical string 1, it is provided that the first winding element 4 is made of tungsten or a tungsten alloy, and that the second winding element 5 is made of a nickel-based alloy, preferably monel metal.

In accordance with a second preferred embodiment of a musical string 1, it is provided that the first winding element 4 is made of tungsten or a tungsten alloy, and that the second winding element 5 is made of pure aluminum or an aluminum alloy.

In accordance with a third preferred embodiment of a musical string 1, it is provided that the first winding element 4 is made of AlMg2, and that the second winding element 5 is made of NiCu30Fe.

In accordance with a fourth preferred embodiment of a musical string 1, it is provided that the first winding element 4 is made of tungsten or a tungsten alloy, and that the second winding element 5 is made of AlMg3.

In accordance with a fifth preferred embodiment of a musical string 1, it is provided that the first winding element 4 is made of AlMg5, and that the second winding element 5 is made of NiMn.

In accordance with a sixth preferred embodiment of a musical string 1, it is provided that the first winding element 4 is made of tungsten or a tungsten alloy, and that the second winding element 5 is made of NiMn.

The following are principles for understanding and interpreting the present disclosure.

Features are usually introduced with an indefinite article "a, an". Therefore, unless the context indicates otherwise, "a, an" is not to be understood as a number word.

The linking word "or" is to be interpreted as inclusive and not exclusive. Unless the context indicates otherwise, "A or B" also comprises "A and B", where "A" and "B" represent any features.

By means of an ordering numeral, for example "first", "second" or "third", in particular a feature X or a subject matter Y is distinguished in a plurality of embodiments, unless otherwise defined by the disclosure of the invention. In particular, a feature X or subject matter Y with an ordering numeral in a claim does not mean that an embodiment of the invention covered by that claim must have a further feature X or subject matter Y, respectively.

A "substantially" in conjunction with a numerical value includes a tolerance of ±10% around the stated numerical value, unless the context indicates otherwise.

In the case of value ranges, the end points are included unless the context indicates otherwise.

The invention claimed is:

1. A musical string for bowed string instruments, comprising:
- a supporting string core;
- an outer winding layer; and
- at least one first intermediate winding layer, the first intermediate winding layer being arranged between the string core and the outer winding layer, the first intermediate winding layer having at least one first winding element and at least one second winding element, the at least one first winding element and the at least one second winding element being wound around the string core in a form of a multi-start helical line;
- wherein the first winding element is made of a first material and the second winding element is made of a second material, and in that a first value of a first mechanical property of the first material is different from a second value of the first mechanical property of the second material at least to a predeterminable degree of differentiation;
- wherein the first mechanical property is the modulus of elasticity; and
- wherein the predeterminable degree of differentiation is at least 10 GPa.

2. The musical string according to claim 1, wherein:
- the intermediate winding layer comprises a third winding element;
- the third winding element is made of a third material; and
- a third value of the first mechanical property of the third material is different from the first value of the first mechanical property of the first material and the second value of the first mechanical property of the second material to a further predeterminable degree of differentiation.

3. A musical string for bowed string instruments, comprising:
- a supporting string core;
- an outer winding layer; and
- at least one first intermediate winding layer, the first intermediate winding layer being arranged between the string core and the outer winding layer, the first intermediate winding layer having at least one first winding element and at least one second winding element, the at least one first winding element and the at least one second winding element being wound around the string core in a form of a multi-start helical line;
- wherein the first winding element is made of a first material and the second winding element is made of a second material, and in that a first value of a first mechanical property of the first material is different from a second value of the first mechanical property of the second material at least to a predeterminable degree of differentiation;
- wherein the first mechanical property is density; and
- wherein the predeterminable degree of differentiation is at least 5 $g/cm^3$.

4. The musical string according to claim 1, wherein the intermediate winding layer comprises one of:
- two first winding elements and one second winding element;
- one first winding element and two second winding elements;
- three first winding elements and one second winding element;
- one first winding element and three second winding elements;
- two first winding elements and two second winding elements; and
- one first winding element and one second winding element and one third winding element.

5. The musical string according to claim 1, wherein:
- the first winding element is formed as a first wire;
- the second winding element is formed as a second wire; and
- the first wire has a first diameter and the second wire has a second diameter substantially identical to the first diameter.

6. The musical string according to claim 2, wherein:
- the third winding element is formed as a third wire having a third diameter; and
- the third diameter is substantially identical to the first wire and to the second wire.

7. The musical string according to claim 2, wherein:
- at least one of the first material, the second material, and the third material is each a material selected from a group of: tungsten, tungsten alloy, nickel, nickel alloy, tantalum, tantalum alloy, molybdenum, molybdenum alloy, manganese, manganese alloy, ruthenium, ruthenium alloy, rhodium, rhodium alloy, rhenium, rhenium alloy, palladium, palladium alloy, osmium, osmium alloy, beryllium alloy, and phosphor bronze.

8. The musical string according to claim 2, wherein at least one of the first material, the second material, and the third material each comprise a plastic selected from a group of: polymers, aramid, PEK, PAEK, PEEK, PBT, polyester, nylon, polyethylene, PET, PEET, PES, PE, PP, POM, PTFE, PVDF, PVDC, HPPE, PA, and PVC.

9. The musical string according to claim 1, wherein a polymeric damping layer is arranged at least on one area of the first intermediate winding layer facing the string core.

10. The musical string according to claim 2, wherein at least one coating is arranged on at least one of the first winding element, the second winding element, and the third winding element.

11. The musical string according to claim 10, wherein the at least one coating is formed as at least one of an oxide layer, a nitride layer, a sulfide layer, a metal layer, a paint layer, and a plastic layer.

12. The musical string according to claim 1, wherein:
the first winding element is made of one of tungsten and a tungsten alloy; and
the second winding element is made of a nickel-based alloy.

13. The musical string according to claim 12, wherein the second winding element is made of a monel metal.

14. The musical string according to claim 3, wherein:
the intermediate winding layer comprises a third winding element;
the third winding element is made of a third material; and
a third value of the first mechanical property of the third material is different from the first value of the first mechanical property of the first material and the second value of the first mechanical property of the second material to a further predeterminable degree of differentiation.

15. The musical string according to claim 3, wherein the intermediate winding layer comprises one of:
two first winding elements and one second winding element;
one first winding element and two second winding elements;
three first winding elements and one second winding element;
one first winding element and three second winding elements;
two first winding elements and two second winding elements; and
one first winding element and one second winding element and one third winding element.

16. The musical string according to claim 3, wherein:
the first winding element is formed as a first wire;
the second winding element is formed as a second wire; and
the first wire has a first diameter and the second wire has a second diameter substantially identical to the first diameter.

17. The musical string according to claim 14, wherein:
the third winding element is formed as a third wire having a third diameter; and
the third diameter is substantially identical to the first wire and to the second wire.

18. The musical string according to claim 14, wherein:
at least one of the first material, the second material, and the third material is each a material selected from a group of: tungsten, tungsten alloy, nickel, nickel alloy, tantalum, tantalum alloy, molybdenum, molybdenum alloy, manganese, manganese alloy, ruthenium, ruthenium alloy, rhodium, rhodium alloy, rhenium, rhenium alloy, palladium, palladium alloy, osmium, osmium alloy, beryllium alloy, and phosphor bronze.

19. The musical string according to claim 14, wherein at least one of the first material, the second material, and the third material each comprise a plastic selected from a group of: polymers, aramid, PEK, PAEK, PEEK, PBT, polyester, nylon, polyethylene, PET, PEET, PES, PE, PP, POM, PTFE, PVDF, PVDC, HPPE, PA, and PVC.

20. The musical string according to claim 3, wherein a polymeric damping layer is arranged at least on one area of the first intermediate winding layer facing the string core.

21. The musical string according to claim 14, wherein at least one coating is arranged on at least one of the first winding element, the second winding element, and the third winding element.

22. The musical string according to claim 21, wherein the at least one coating is formed as at least one of an oxide layer, a nitride layer, a sulfide layer, a metal layer, a paint layer, and a plastic layer.

23. The musical string according to claim 3, wherein:
the first winding element is made of one of tungsten and a tungsten alloy; and
the second winding element is made of a nickel-based alloy.

24. The musical string according to claim 23, wherein the second winding element is made of a monel metal.

* * * * *